United States Patent
Zeng et al.

(10) Patent No.: US 11,645,148 B2
(45) Date of Patent: May 9, 2023

(54) METHOD AND APPARATUS FOR CACHING MTE AND/OR ECC DATA

(71) Applicant: FLC Technology Group, Inc., Santa Clara, CA (US)

(72) Inventors: Xiaojue Zeng, Santa Clara, CA (US); Cheng Chung Wang, Fremont, CA (US); Fan Yang, San Jose, CA (US); Rong Xu, Mountain View, CA (US); Bo Hu, Santa Clara, CA (US); Hunglin Hsu, Cupertino, CA (US); Sehat Sutardja, Las Vegas, NV (US)

(73) Assignee: FLC Technology Group, Inc., Santa Clara, CA (US)

( * ) Notice: Subject to any disclaimer, the term of this patent is extended or adjusted under 35 U.S.C. 154(b) by 0 days.

(21) Appl. No.: 17/243,172

(22) Filed: Apr. 28, 2021

(65) Prior Publication Data

US 2021/0334158 A1 Oct. 28, 2021

Related U.S. Application Data

(60) Provisional application No. 63/016,850, filed on Apr. 28, 2020.

(51) Int. Cl.
*G11C 29/00* (2006.01)
*G06F 11/10* (2006.01)
(Continued)

(52) U.S. Cl.
CPC ...... *G06F 11/1064* (2013.01); *G06F 11/1068* (2013.01); *G06F 11/3037* (2013.01);
(Continued)

(58) Field of Classification Search
CPC ............. G06F 11/1064; G06F 11/1068; G06F 11/3037; G06F 13/1668; G06F 12/0238; G06F 2212/403; G06F 2212/1021
See application file for complete search history.

(56) References Cited

U.S. PATENT DOCUMENTS

2004/0237022 A1 11/2004 Karpuszka et al.
2007/0276976 A1 11/2007 Gower et al.
(Continued)

FOREIGN PATENT DOCUMENTS

KR 10-2017-0102723 9/2017

*Primary Examiner* — Samir W Rizk
(74) *Attorney, Agent, or Firm* — Weide & Miller, Ltd.

(57) ABSTRACT

A system and method for caching memory request verification data comprising a memory request generator configured to generate a memory request designating requested data and memory request verification data. A bus is configured to carry the memory request from the memory request generator to a cache memory that stores verification data, and upon receiving the memory request is configured to: retrieve stored verification data from the cache memory, compare the stored verification data to the memory request verification data, and responsive to a match between the stored verification data to the memory request verification data, designate a memory request validation. Also part of the system is a memory controller configured to, responsive to a memory request validation, retrieve data specified in the memory request from a main memory and provide the data to the memory request generator over the bus. A main memory configured to store the requested data.

21 Claims, 3 Drawing Sheets

(51) Int. Cl.
*G06F 11/30* (2006.01)
*G06F 13/16* (2006.01)
*G06F 12/02* (2006.01)

(52) U.S. Cl.
CPC ...... *G06F 12/0238* (2013.01); *G06F 13/1668* (2013.01); *G06F 2212/1021* (2013.01); *G06F 2212/403* (2013.01)

(56) References Cited

U.S. PATENT DOCUMENTS

| | | |
|---|---|---|
| 2010/0185904 A1 | 7/2010 | Chen |
| 2013/0283126 A1 | 10/2013 | Ramaraju |
| 2018/0373635 A1* | 12/2018 | Mukherjee .......... G06F 12/0846 |
| 2020/0285550 A1* | 9/2020 | Vrabel ................ G06F 11/1064 |

* cited by examiner

METHOD AND APPARATUS FOR CACHING MTE AND/OR ECC DATA

1. FIELD OF THE INVENTION

The innovation relates to memory access, and in particular to a method and apparatus for caching MTE and/or ECC data.

2. RELATED ART

In traditional DRAM designs for server and networking chip applications, error correction is usually transmitted through side-band pins. However, for low cost solutions, such as but not limited to mobile devices, an in-line ECC arrangement may be used to place the ECC information on the same memory (die) as the data.

In addition, memory tagging is one type of CPU architecture that enables memory protection in hardware. For every memory request, other than the physical address, a memory tag is associated with the memory request. Being part of the request's metadata, this memory tag is stored in DRAM as well.

However, for devices that support in-line ECC, every read or partial write command will be accompanied by an ECC read command. Every write command will generate an additional ECC write command. For devices that support memory tagging, every read and write command will be accompanied by a memory tag read command. This results in a consuming memory read operation to obtain the memory tag and/or ECC data, as well as another time consuming memory read operation to read the actual data. Two time consuming memory read operations from DRAM slow data transfer rates, and memory bandwidth and latency are degraded.

SUMMARY

To overcome and mitigate the bandwidth and latency issue of the prior art while maintaining low system cost when storing in-line ECC data, memory tag data, or both in a computing device, an ECC cache and a memory tag cache is proposed. The term memory tag is defined to mean any data used to ensure data security. Many other types of tagging or security data are contemplated for memory protection and as a result, this innovation is not limited to MTE data. The term ECC data is any type data used for error checking and/or error correction. It is contemplated that an ECC cache or a memory tag cache, or even a combined ECC and memory tag cache may be provided. Memory tags are referred to herein as MTE data and ECC information is referred to as ECC data.

To further improve performance, ECC and memory tags can be placed in one high speed cache to reduce latency and thus require a single cache memory of small size. The read/write access time for the cache is less than that of the DRAM memory. When data is read from memory, one burst of DRAM fetches ECC and MTE data that serves, corresponds to, or is associated with multiple bursts of data. Thus, performance is improved such that one burst of ECC and MTE data, which is placed in the high-speed cache, is capable of providing the ECC and MTE data for multiple subsequent memory requests. This allows, in response to a memory request, the ECC and MTE data stored in the high-speed cache to be quickly retrieved and used to satisfy the memory request instead of requiring a slower DRAM read to retrieve the ECC and MTE data. The processing and verification of ECC and MTE data occurs in any manner known in the art and thus are not described in detail herein.

It is also contemplated that when request data is read from the DRAM, ECC and MTE data from sequential data locations is also read from the DRAM and stored in the cache. Because future memory requests to DRAM often request data stored in sequential data locations, in relation to the prior memory request, filling the cache with ECC and MTE data associated with sequentially located data, will increase hit rates in the cache. This may be referred to as spatial locality.

Further, the cache is configured such that the most recently used ECC and MTE data is maintained in the cache, thus taking advantage of the fact that data requested as part of a memory requests is often re-requested in the near future. This is referred to as temporal locality. Stated another way, recently used ECC and MTE data is likely to be used again, and as such recently used ECC and MTE data is maintained in the cache while the least recently used ECC and MTE data is overwritten or discarded from the cache.

To overcome the drawbacks of the prior art, a system for caching error correction data, memory safety data, or both is disclosed. In one embodiment, the system includes a memory request generator configured to generate a memory request designating requested data, as well as associated error correction data, memory safety data, or both. A bus is configured to carry the memory request from the memory request generator and a cache memory is configured to store error correction data, memory safety data, or both. Upon receiving the memory request the cache is configured to retrieve stored error correction data, stored memory safety data, or both from the cache memory and then compare the stored error correction data, stored memory safety data, or both to the error correction data, memory safety data, or both in the memory request. Responsive to a match between the stored error correction data, stored memory safety data, or both to the error correction data, memory safety data, or both in the memory request, designate a memory request validation. Also part of the system is a memory controller configured to, responsive to a memory request validation, provide data specified in the memory request from a main memory to the memory request generator over the bus. A main memory is configured to store the requested data.

The error correction data may comprise error correction codes and the memory safety data comprises memory tag extension data. The cache memory may be configured as a most recently used data cache memory. The memory request generator may be a processor. In one configuration, the memory request includes a data structure that comprises a physical address, ECC data, ECC data for MTE data, and MTE data. The main memory may be DRAM memory. The cache memory may be configured to determine if the error correction data, memory safety data, or both associated with the memory request is located in the cache memory and, responsive to the error correction data, memory safety data, or both associated with the memory request not being stored in the cache memory, then retrieving the error correction data, memory safety data, or both from the main memory and storing the error correction data, memory safety data, or both in the cache memory. In one embodiment, responsive to a cache miss, the cache retrieves a burst of error correction data, stored memory safety data, or both from the main memory and stores the burst in the cache memory.

Also disclosed is a method for validating verification data comprising receiving a memory request with associated memory request verification data at a cache memory such that the cache memory storing verification data. Querying the cache memory for stored verification data corresponding to the memory request verification data and, responsive to the cache memory not containing stored verification data which corresponds to the memory request verification data, designating a cache miss. Alternatively, responsive to the cache miss, retrieving a burst of validation data from a main memory and populating the cache memory with the burst of validation data from main memory. Responsive to the cache memory containing stored verification data which corresponds to the memory request verification data, the method of operation compares the stored verification data to the memory request verification data. Responsive to a match between the stored verification data to the memory request verification data, this method of operation validates the memory request verification data.

In one embodiment, the verification data comprises one or more of ECC data, MTE data and the cache comprises SRAM. The step of comparing may be performed by the cache memory. The main memory may comprise DRAM. This method may further comprise, after populating the cache memory with the burst of validation data, comparing the stored verification data to the memory request verification data, and responsive to a match between the stored verification data to the memory request verification data, validating the verification data associated with the memory request.

Also disclosed is a system for caching verification data which includes a bus configured to carry a data request, such that the data request includes requested data and data request verification data that includes an address for the data request verification data. A cache memory is provided that maintains or stores stored verification data associated with an address. The cache memory may be configured to receive the data request verification data, retrieve stored verification data based on the address, and compare the stored verification data to the verification data associated with the data request. Responsive to a match between the stored verification data and the data request verification data, validating the data request verification data, and responsive to validation of the data request verification data, provide the requested data to the bus.

The data request verification data may be one or more of: ECC data, ECC MTE data, and MTE data. In one embodiment, the cache memory is configured as a most recently used data cache memory. It is contemplated that the requested data is provided to a processor. In one configuration, the cache memory is further configured to, responsive to a cache miss, retrieve a burst of verification data from the main memory and store the burst in the cache memory.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

An in-line ECC and memory tag (MTE) cache is proposed to be placed between a fabric (bus), that connects the memory (DRAM), and a memory controller. The cache stores both ECC and MTE data. In other embodiments, more than one cache or level of cache may be used such that different data may be stored in separate caches. In one embodiment, the cache is configured to perform memory tag checking as well as ECC detection and correction. In other embodiments, the memory controller or other element may perform memory tag checking as well as ECC detection and correction. The memory tag data and the ECC data is verified to be accurate and error free before allowing access to the data stored in DRAM. If the verification process confirms/establishes that the memory tag and ECC data corresponds to stored data, then the verified memory request transactions may proceed to the memory controller. If the verification process confirms/establishes that the memory tag and ECC data do not correspond to stored data, then access to memory is not allowed.

The verification of the memory tag data and/or ECC data may also be referred to as certification or physical address certification. The memory tag data is used to certify a physical address. This prevents, for example, hackers from injecting their own address to improperly access data stored in DRAM. In one embodiment, one DRAM burst of metadata will be allocated and stored in the cache, and the size of this burst is sufficient to read and retrieve multiple MTE and ECC data which will accommodate multiple memory requests. This reduces the number of time-consuming DRAM memory requests that need to occur. Instead, the high-speed cache is accessed to obtain the MTE data and ECC data for subsequent memory requests. If there is a cache hit, then the MTE data and ECC data does not need to be pulled from the DRAM, only the requested data (burst of data) is pulled, which results in a reduced number of data reads thereby lowering latency. In the event of a cache miss two memory read operations would occur, but cache misses are expected to be rare.

In one embodiment, the metadata is defined as the ECC and MTE data. The cache will update the metadata in DRAM upon replacement. For example, upon replacement, least recently used metadata in the cache will be replaced. This least recently used metadata will be written back to the corresponding DRAM entry. By doing so, metadata read requests to and from the DRAM can be greatly reduced because the metadata is stored in the cache.

Figure 1:
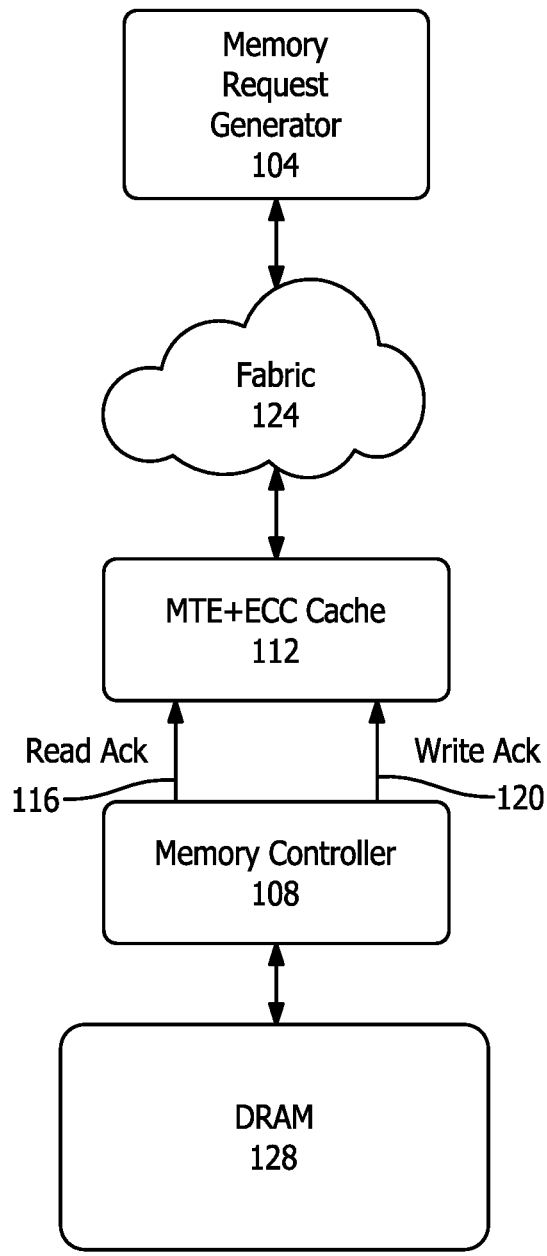
FIG. 1 is a block diagram illustrating an example embodiment of a MTE and ECC cache system in an example environment of use.

FIG. 1 is a block diagram illustrating the MTE+ECC cache in an example environment of use. This is but one possible example embodiment and it is contemplated that other elements and configuration are possible. The innovation described herein may be used in connection with any memory system and is particularly well suited to mobile devices, automobiles, tablets, laptop computers, desktop computers, wearable electronic devices, or any other computing device that utilizes memory.

This embodiment includes a memory request generator 104, such as a central processing unit (CPU) that communicates with a fabric 124. The fabric 124 may also be referred to as a bus. Although shown as a memory request generator 104, it could be replaced with any device that generates or sends a memory or data request to a memory controller, such as but not limited to, a CPU processor, ASIC, graphics processing unit, DSP, or video codec.

In this configuration, the fabric 124 communicates the memory (data) requests to a cache 112. The cache 112 is configured as an MTE+ECC cache which stores MTE data and ECC data. Although shown as an MTE+ECC cache, it is contemplated that any type data may be stored in the cache in accordance with the principles of operation described herein. The MTE+ECC cache 112 may comprise any type cache system including any combination of hardware, software, or both. In this configuration, the cache 112 is configured as a most recently used cache such that least recently used MTE+ECC data is replaced with more recently used MTE+ECC data. Cache systems and operation is understood in the art and as a result, is not described in detail herein.

In one embodiment, the MTE+ECC cache 112 includes logic or other processing elements configured to compare MTE+ECC data (received in a data request that includes MTE+ECC data) with MTE+ECC data that is stored in the cache or from memory (DRAM or other type memory) to validate the MTE+ECC data, such as by comparison. This is discussed in greater detail in FIG. 4. It is also contemplated that the processing elements which compare MTE+ECC data received in a data request with MTE+ECC data stored in the cache may be located in the memory controller, or any other component of the device.

The processing that compares MTE+ECC data received in a data request with MTE+ECC data stored in the cache may occur in hardware, software, or a combination of both. The cache 112 may be any size, and in one embodiment the cache is of sufficient size to mitigate any performance impact that would occur from a smaller sized cache. The cache is formed from memory, such as but not limited to SRAM, which is faster than the DRAM.

In one embodiment the cache 112 may be configured as a layer of logic and memory located between the fabric 124 and a memory controller 108. Upon a linefill or eviction, data to and/or from the memory is accompanied by the ECC and MTE data. The MTE+ECC cache 112 performs metadata caching, checking and verification before letting transactions go to the memory or be executed by the memory controller. In one embodiment, data requests from the generator 104 and retrieved data from the DRAM 128 pass through the cache 112 and part of the data request process so that the cache can be updated and the MTE, ECC data can be processed and compared.

It is contemplated that the cache may be a write-back, write-allocate type cache. In other embodiments, other type caches may be used. As configured, one cache line holds one DRAM burst of metadata, enough for 8 DRAM bursts of normal data. In other embodiment, other size or capacity cache lines may be utilized.

The MTE+ECC cache 112 communicates with the memory controller 108. In this embodiment, the memory controller 108 communicates or exchanges read acknowledgement signals 116 and write acknowledgement signals 120 with the MTE+ECC cache 112. The memory controller 108 may be any device that communicates with or interfaces with a memory. Although memory controllers are typically implemented in hardware, it is contemplated that the memory controller 108 may be any type hardware, software, or combination of both configured to operate as described herein. The memory controller 108 communicates with memory 128, such as DRAM, as is known and understood in the art. Although shown as DRAM, any type memory may be used. If the system changes the MTE data on-the-fly, then it may be necessary to flush the MTE+ECC cache. Although described herein such that the cache has 8-way associativity, it is contemplated that other degrees (numeric values) of associativity may be utilized, such as a larger degree of associativity for larger systems. In one embodiment, upon a cache miss, a younger or more recent transaction not hitting the same line can proceed.

Figure 2:
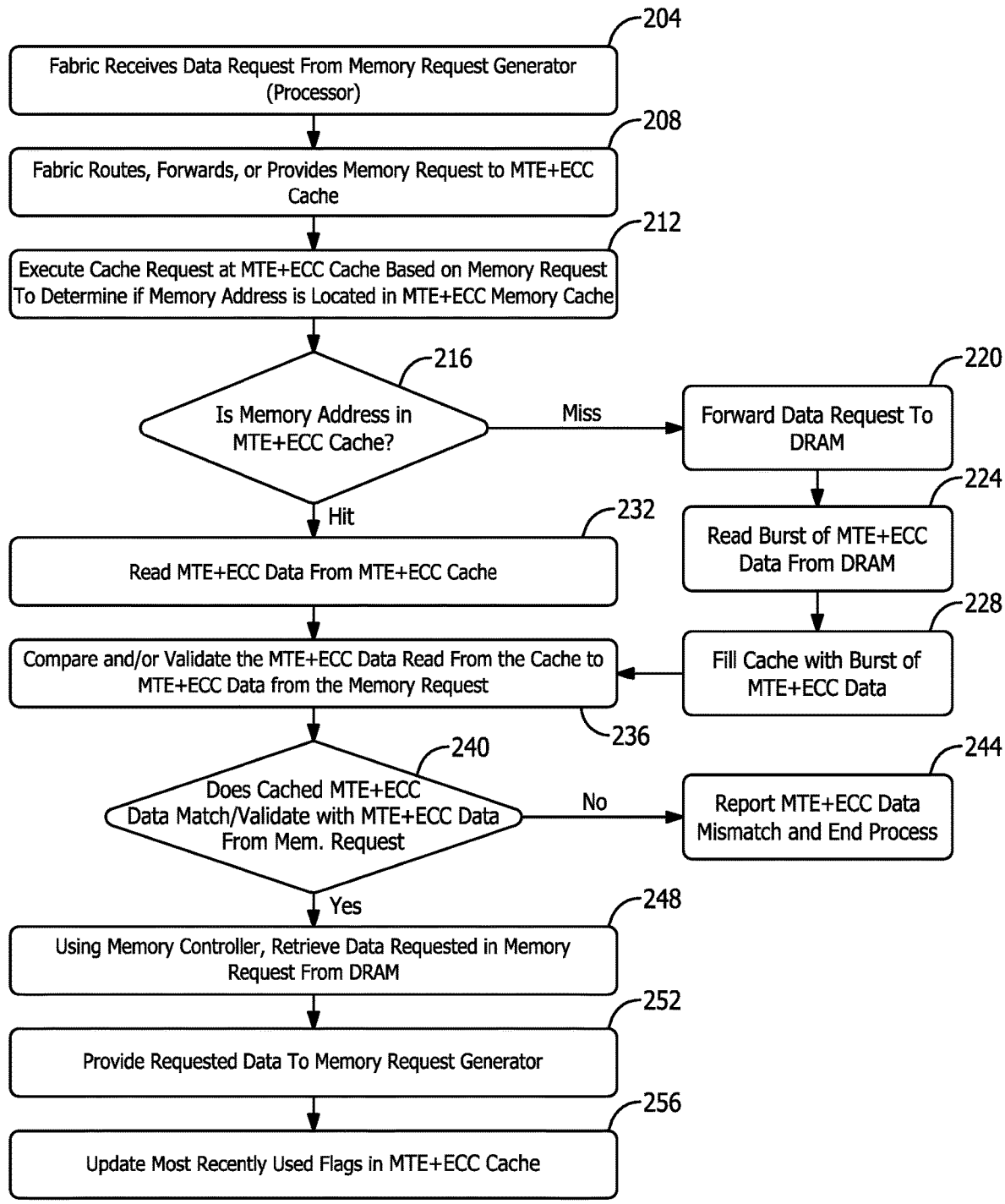
FIG. 2 is an operational flow diagram of an example method of operation.

FIG. 2 is an operational flow diagram of an example method of operation. This is but one possible method of operation and other methods are contemplated based on this disclosure. At a step 204, a data request is received from a memory request generator, such as CPU, at the fabric or bus. The memory request may include a request for data and may include data address information, MTE data and ECC data. Next at a step 208, this method of operation forwards or provides the memory request to the MTE+ECC cache. The memory request carries with it the MTE data and the ECC data is calculated from the data that is in the memory request. As discussed below, the MTE and ECC data from the memory request is compared to MTE and ECC data stored in the cache.

Figure 4:
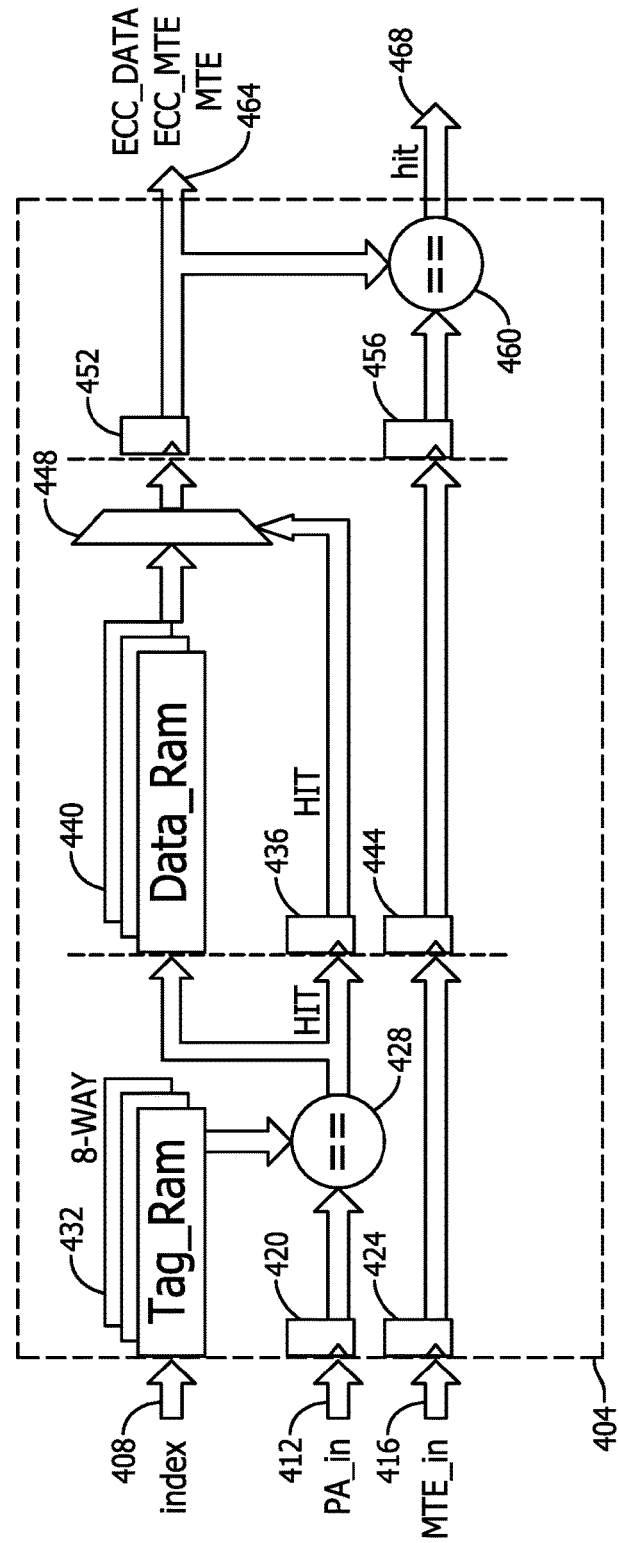
FIG. 4 is a block diagram of an exemplary MTE and ECC cache.

At a step 212, the MTE+ECC cache executes a cache request based on the memory request to determine if the memory address is located in the MTE+ECC cache. Thus, the memory request is processed by the MTE+ECC cache to determine if the cache contains MTE+ECC data associated with or corresponding to the memory request, such as for example, based on the requested memory address. At a decision step 216, it is determined if the memory address is in the MTE+ECC cache. FIG. 4 and the discussion of FIG. 4 provides greater details regarding step 216. If the memory address for the MTE and ECC data is not in the MTE+ECC cache, then the cache request is a miss and the operation advances to step 220 as a result of the miss.

At step 220 the MTE+ECC cache or the memory controller forwards the memory request to the DRAM. Then, at step 224, a burst is read from the DRAM to obtain MTE+ECC data from the DRAM as well as the requested data per the data request. Thus, even in the event of a miss, both the MTE+ECC data and the actual data requested by the memory request generator 104 is retrieve from the DRAM. In another embodiment, only MTE+ECC data is read from the DRAM, stored in the cache, compared, and then, responsive to the MTE+ECC data comparison indicating a match, the requested data is retrieve from the DRAM. In another embodiment, two or more memory requests occur such that a first memory request obtains the MTE+ECC data and the second request obtains the requested data. For example, the requested data may be required and processed as part of the MTE+ECC data comparison and verification prior to the requested data being provided to the request generator 104. As is understood, the ECC created may be created when the requested data was originally stored to memory. The ECC and/or MTE data may be stored in the same or a different memory than the data requested by the request generator.

Thereafter, at a step 228 the cache stores the MTE+ECC data read from the DRAM in the cache. Due to the size of the burst read from DRAM being larger than the size of one set of MTE+ECC data, when a burst is read from DRAM, multiple sets of MTE+ECC data are collected from DRAM and stored in the cache. In one embodiment, sequential MTE+ECC data sets (as located in the DRAM) are read from DRAM and stored in the cache. Typically, data read sequentially is stored sequentially in DRAM, and as a result, the cache has a high likelihood of containing the MTE+ECC data for subsequently requested data. After, step 228, the operation advances to step 236, which is discussed below.

Alternatively, if at step 216 the cache request results in a hit, the operation advances to step 232. At step 232, the cache reads the MTE+ECC data from the MTE+ECC cache. In one embodiment, the cache stores the MTE+ECC data but not the requested data. Then, at a step 236 a comparison or validation occurs between the MTE+ECC data read from the cache and the MTE+ECC data from the memory request. This comparison or validation may occur in the cache, the memory controller, or another element. For example, ECC data may be processed to check for and/or correct errors. If this data does not match or validate, there may be a security breach or a data error. The comparison may be any type comparison currently known or developed in the future. In one embodiment, the comparison includes a hash function, an operation similar to a hash function, or a coding/decoding function.

At decision step 240 a determination is made regarding whether the MTE+ECC data read from the cache matches or validates against the MTE+ECC data in the memory request. If a match or validation does not occur, then the operation advances to step 244 and the mismatch between the MTE+ECC data is reported and the process ends.

Alternatively, if at decision step 240 the MTE+ECC data read from the cache matches and/or is validated against the MTE+ECC data from the memory request, then the operation advances to step 248. At step 248 the data match and/or validation allows the system to read or retrieve the data requested in the memory request from the DRAM. This occurs in the manner typical in the art. At a step 252, the data retrieved as part of the memory request is provided to the memory request generator. To maintain the cache, at a step 256, the most recently used flags, or other such tracking element in the cache, is updated to reflect the most recently used status of the data provided to the memory request generator.

One benefit of this system and method of operation, is that the cache comprises high speed memory, such as but not limited to SRAM, allowing read/write operations to occur rapidly thereby reducing system latency. The speed of the cache memory is typically 30 to 60 times faster than DRAM. As shown by step 224, only if the MTE+ECC data is not in the cache, is the time consuming read from DRAM required to obtain MTE+ECC data for the memory request. Once populated, the cache is highly likely to contain the MTE+ECC data, thereby requiring only one fast cache read and one standard speed DRAM read to satisfy a memory request from a memory request generator. This is faster than prior art systems which require two time consuming DRAM memory reads. This innovation results in greater memory bandwidth and less latency, as compared to prior art systems.

Figure 3:
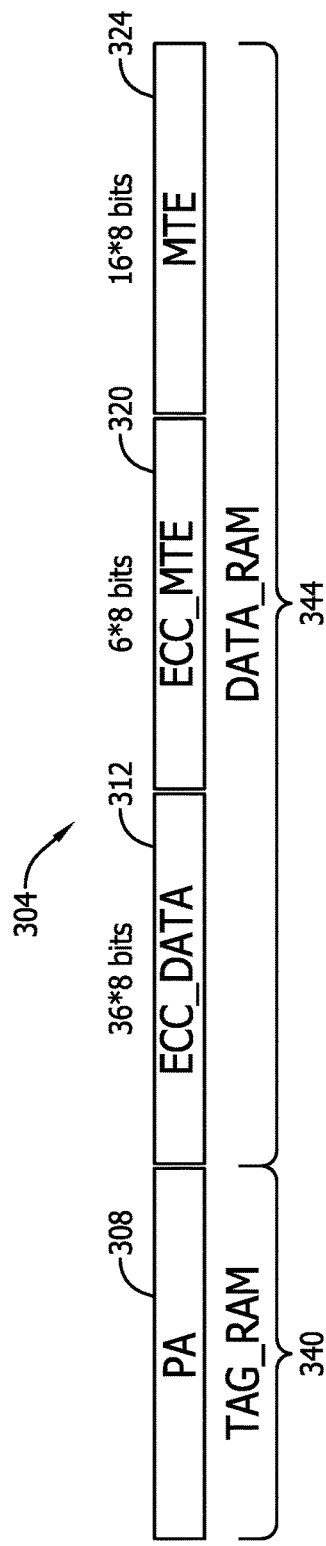
FIG. 3 is an exemplary data structure containing address, ECC, and MTE data.

FIG. 3 is an exemplary data structure 304 containing a physical address, ECC, and MTE data as stored in the cache structure and provided to the cache. This is but one possible data structure 304. The data structure includes a physical address (PA) section 308, an ECC data section 312, a ECC-MTE section 320, and a MTE section 324. The size of sections 312, 320, 324 is shown above each respective section. The data structure 304 may be further defined as the PA data 340 stored in tag RAM (element 432 of FIG. 4) and ECC and MTE data 344 stored in data RAM (element 440 of FIG. 4). As discussed in FIG. 4 below, this data structure is provided to the cache to located stored ECC and MTE data associated with the memory request. The physical address (TAG_RAM) 308 identifies a memory location within the cache where the ECC_Data 312, ECC_MTE data 320, and MTE data 324 is located. The memory request from the memory request generator 104 (FIG. 1) also includes the normal memory transaction information.

FIG. 4 is a block diagram of an exemplary MTE+ECC cache. This is one possible example embodiment of a cache. Other cache designs are contemplated for use with this innovation. The cache 404 includes three inputs, namely an index input 408, a physical address (PA) input 412, and a MET input 416. The index 408 is a portion of an address that is provided to the tag RAM 432. In one configuration, the tag RAM 432 stores physical addresses. In this embodiment, the index input 408 is provided to an 8-way associative tag RAM 432 to retrieve one or more addresses that may match a physical address. The PA (physical address) input 412 and MTE data input 416 are received as part of the memory request and provided to registers 420, 424 as shown. In one embodiment, the index is found in the lower bits of the memory request while the physical address is found in the upper bits of the memory request. In other embodiments, the tag RAM 432 may have different levels or degrees of association.

The tag RAM 432 processes the index input 408 to locate and output corresponding physical address, which is provided to a comparator 428. The comparator 428 also receive the physical address input from the register 420 and performs a comparison. If the two physical addresses match, a hit occurs, and the physical address is output from the comparator 428 to a register 436 and to data RAM 440. The data RAM 440 stores MTE data and ECC data. Timing is maintained by the output of register 424 being input to register 444.

Using the physical address 412 provided from the comparator 428, the data RAM 440 locates and outputs a set of MTE+ECC data, that is associated with the physical address, to a multiplexer 448 or other type switch. In this embodiment, data RAM 440 is 8-way associative, causing eight outputs to be in the set of MTE+ECC data provided to the multiplexer 448. In other embodiments, other levels of associative-ness may be established. The output from register 436 is provided to the multiplexer 448 to select the correct input of the eight inputs from the data RAM 440. The output of the multiplexer 448 is provided to register 452 while the output of the register 444 is provided to register 456.

The output of register 452 is presented as the ECC data, the ECC MTE, and the MTE data on output 452. The MTE data is also provided to a comparator 460 which compares the MTE data from the data RAM 440 to the MTE data input 416. A match by the comparator 460 yields a hit, which is provided on output 468. The output of the cache 404 is the MTE and ECC data which is processed in a manner in the art for verification and error detection/correction before a memory read can occur.

While various embodiments of the invention have been described, it will be apparent to those of ordinary skill in the art that many more embodiments and implementations are possible that are within the scope of this invention. In addition, the various features, elements, and embodiment described herein may be claimed or combined in any combination or arrangement.

What is claimed is:

1. A system for caching error correction data, memory safety data, or both comprising:
   a memory request generator configured to generate a memory request designating requested data, as well as associated error correction data, memory safety data, or both;

a bus configured to carry the memory request from the memory request generator;
a cache memory storing error correction data, memory safety data, or both, but not requested data, and upon receiving the memory request is configured to:
retrieve stored error correction data, stored memory safety data, or both from the cache memory, wherein the error correction data is associated with requested data is stored in the main memory;
compare the stored error correction data, stored memory safety data, or both to the error correction data, memory safety data, or both in the memory request;
responsive to a match between the stored error correction data, stored memory safety data, or both to the error correction data, memory safety data, or both in the memory request, designate a memory request validation;
a memory controller configured to, responsive to a memory request validation, provide data specified in the memory request from a main memory to the memory request generator over the bus; and
a main memory configured to store the requested data.

2. The system of claim 1 wherein the error correction data comprises error correction codes and the memory safety data comprises memory tag extension data.

3. The system of claim 1 wherein the cache memory is configured as a most recently used cache memory.

4. The system of claim 1 wherein the memory request generator is a processor.

5. The system of claim 1 wherein the memory request includes a data structure that comprises a physical address, ECC data, ECC data for MTE data, and MTE data.

6. The system of claim 1 wherein the main memory is DRAM memory.

7. The system of claim 1 wherein the cache memory is further configured to determine if the error correction data, memory safety data, or both associated with the memory request is located in the cache memory and, responsive to the error correction data, memory safety data, or both associated with the memory request not being stored in the cache memory, then retrieving the error correction data, memory safety data, or both from the main memory and storing the error correction data, memory safety data, or both in the cache memory.

8. The system of claim 1 wherein responsive to a cache miss, retrieving a burst of error correction data, stored memory safety data, or both from the main memory and storing the burst in the cache memory.

9. A method for validating verification data comprising:
receiving a memory request for requested data with associated memory request verification data at a cache memory, the cache memory storing verification data, but not the requested data which is stored in a main memory;
querying the cache memory for stored verification data corresponding to the memory request verification data;
responsive to the cache memory not containing stored verification data which corresponds to the memory request verification data, designating a cache miss;
responsive to the cache miss, retrieving a burst of validation data, but not the requested data, from a main memory and populating the cache memory with the burst of validation data from main memory, wherein the validation data stored in the cache memory is validation data used for data stored in the main memory;
responsive to the cache memory containing stored verification data which corresponds to the memory request verification data, comparing the stored verification data to the memory request verification data;
responsive to a match between the stored verification data to the memory request verification data, validating the memory request verification data.

10. The method of claim 9 wherein the verification data comprises one or more of ECC data, MTE data.

11. The method of claim 9 wherein the cache comprises SRAM.

12. The method of claim 9 wherein comparing is performed by the cache memory.

13. The method of claim 9 wherein the main memory comprises DRAM.

14. The method of claim 9 further comprising, after populating the cache memory with the burst of validation data:
comparing the stored verification data to the memory request verification data;
responsive to a match between the stored verification data to the memory request verification data, validating the verification data associated with the memory request.

15. A system for caching verification data comprising:
a bus configured to carry a data request, the data request defining requested data and data request verification data that includes a verification data address for the data request verification data;
a cache memory containing stored verification data associated with an address, but not the requested data, the cache memory configured to:
receive the data request verification data;
retrieve stored verification data from the cache memory based on the address;
compare the stored verification data to the verification data associated with the data request, wherein the stored verification data is for main memory data and not content in the cache memory;
responsive to a match between the stored verification data and the data request verification data, validating the data request verification data; and
responsive to validation of the data request verification data, retrieve the requested from a main memory and provide the requested data to the bus.

16. The system of claim 15 wherein the data request verification data is one or more of: ECC data, ECC MTE data, and MTE data.

17. The system of claim 15 wherein the cache memory is configured as a most recently used data cache memory.

18. The system of claim 15 wherein the requested data is provided to a processor.

19. The system of claim 15 wherein the data request verification data is in a data structure that comprises a physical address, ECC data, ECC MTE data, and MTE data.

20. The system of claim 15 wherein the main memory is DRAM memory.

21. The system of claim 15 wherein the cache memory is further configured to, responsive to a cache miss, retrieve a burst of verification data from the main memory and store the burst in the cache memory.

* * * * *